United States Patent [19]
Dillon et al.

[11] Patent Number: 4,612,109
[45] Date of Patent: Sep. 16, 1986

[54] METHOD FOR CONTROLLING FOAMING IN DELAYED COKING PROCESSES

[75] Inventors: Edward T. Dillon, Houston, Tex.; David L. Edmonds, Wichita, Kans.

[73] Assignee: NL Industries, Inc., New York, N.Y.

[21] Appl. No.: 734,958

[22] Filed: May 16, 1985

Related U.S. Application Data

[62] Division of Ser. No. 201,573, Oct. 28, 1980, abandoned.

[51] Int. Cl.$^4$ .............................................. C10G 9/14
[52] U.S. Cl. .................................. 208/131; 252/321; 252/358
[58] Field of Search ............... 208/131, 48 R, 48 AA; 252/321, 358

[56] References Cited
U.S. PATENT DOCUMENTS

| | | | |
|---|---|---|---|
| 3,700,587 | 10/1972 | Hyde | 208/131 |
| 3,865,544 | 2/1975 | Keil | 252/321 X |
| 4,092,266 | 5/1978 | Abel et al. | 252/358 X |
| 4,176,047 | 11/1979 | Orrell et al. | 208/131 X |
| 4,176,052 | 11/1979 | Bruce et al. | 208/131 |

Primary Examiner—Andrew H. Metz
Assistant Examiner—Glenn A. Caldarola
Attorney, Agent, or Firm—Browning, Bushman, Zamecki & Anderson

[57] ABSTRACT

A defoaming composition comprising an organo siloxane polymer, an aliphatic alcohol such as 2-ethylhexanol and, optionally, a liquid carrier which can be added to a coking drum in a delayed coking process to reduce foaming. In cases where the feed stock used in the delayed coking process contains greater than one half percent total sulfur, defoaming in the coking drum can be accomplished by adding an aliphatic alcohol such as 2-ethylhexanol.

15 Claims, 1 Drawing Figure

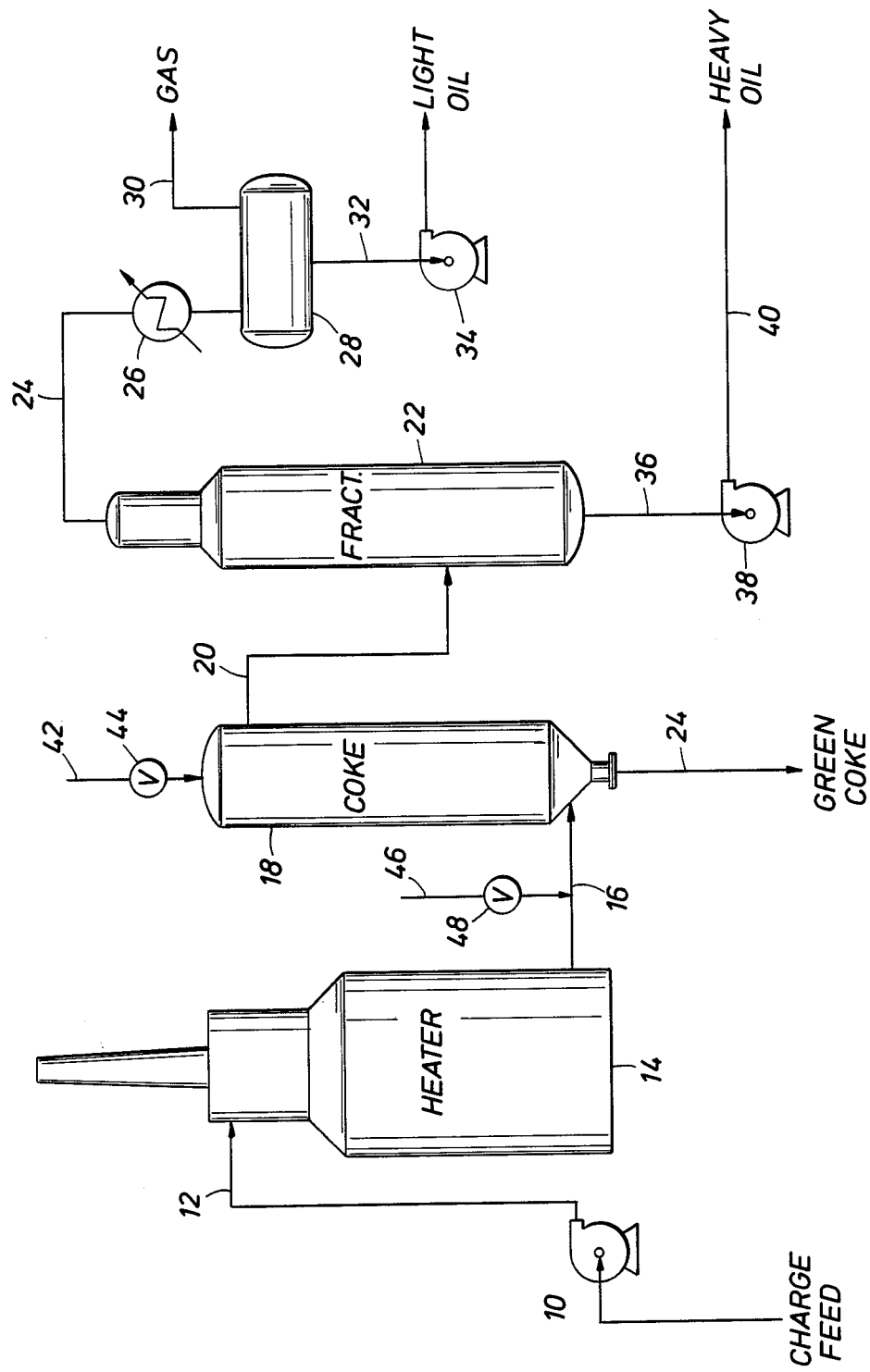

METHOD FOR CONTROLLING FOAMING IN DELAYED COKING PROCESSES

This is a division of application Ser. No. 201,573, filed Oct. 28, 1980, now abandoned.

BACKGROUND OF THE INVENTION

The present invention relates to compositions and methods for controlling foaming in delayed coking operations.

In refinery operations designed to obtain the greatest yield of gasoline, the end residue is generally coke rather than a residual oil, the coke being derived from delayed coking operations. Typically, heavy products such as vacuum tower bottoms or gas oil recycle streams comprise the charge feed to a delayed coking process. The high boiling charge feed is heated to a temperature of between 700°–1000° F. and then fed into a coking drum. The preheating of the charge feed supplies the heat necessary in the coking drum to crack high molecular weight hydrocarbons forming coke and volatile hydrocarbons. A fractionator is used to separate the volatile hydrocarbons recovered from the coking drum. Because of the nature of the components present in the charge feed to the coking drum, there is a tendency, on occasion, for foaming to occur in the coking drum. Foaming can disrupt operation of the fractionator and result in carry over of unwanted components with the fractions removed from the fractionator. To control the foaming, it is common practice to add a liquid silicone defoaming agent to the charge feed. This has several disadvantages. For one, silicone defoamers are quite expensive. Additionally, there is frequently carry over of the silicone defoamer in the fractions recovered from the fractionator. If these fractions are subsequently used as feed stocks for reforming units, poisoning of the reforming catalyst can result.

SUMMARY OF THE INVENTION

It is therefore an object of the present invention to provide an improved method for preventing foaming in delayed coking process.

A further object of the present invention is to provide a new defoaming composition especially suited for use in a delayed coking operation.

In accordance with the above objects, there is provided, in one embodiment, a defoaming composition comprising a liquid, organo siloxane polymer and an aliphatic alcohol having from 6 to 12 carbon atoms. Optionally, the defoaming composition can contain a solvent or carrier for the active siloxane and alcohol components, such as polyol formed by the reaction of an alkylene oxide such as ethylene oxide or propylene oxide with dipropylene glycol, kerosene, naphtha, etc.

In another embodiment of the present invention the above composition containing the siloxane polymer and the aliphatic alcohol, preferably with a carrier, are added to a coking drum used in a delayed coking process in an amount sufficient to control foaming in the coking drum.

In a further embodiment of the present invention, a composition comprised of one of the above named aliphatic alcohols preferably in a solvent or carrier such as a polyol is added, in an effective amount, to a coking drum to control foaming.

BRIEF DESCRIPTION OF THE DRAWING

The single FIGURE is a simplified schematic flow diagram of a typical delayed coking process.

DESCRIPTION OF THE PREFERRED EMBODIMENTS

The novel defoaming compositions of the present invention contain an organo siloxane polymer, and an aliphatic alcohol. The organo siloxane polymer, commonly referred to as a silicone, has the general structure $(R_2SiO)_n$ wherein R is an organic radical such as, for example, methyl, ethyl, propyl, etc. Especially preferred are dimethyl polysiloxanes such as, for example, dimethyl silicone fluids sold under the trademark Viscasil marketed by General Electric Company. The organic siloxane polymers useful in the present invention are those having viscosities ranging from around 8,000 to about 100,000 centistokes, preferably from about 10,000 to 60,000 centistokes, especially around 12,500 centistokes. The organo siloxane polymer will be present in the composition of the present invention in amounts ranging from about 0.1 to about 20% by weight. It is a particular feature of the present invention that the silicone containing anti-foaming compositions of the present invention are low in silicones but still provide the same foam control properties at the same injection rates as prior art concentrated silicone products. As previously noted, such concentrated silicone based materials tend to migrate to the naphtha fractions removed from the delayed coking process and can lead to downstream catalyst poisoning in reformers and the like.

The other component of the novel silicone containing compositions of the present invention is an aliphatic alcohol having from about 6 to about 12 carbon atoms. Non-limiting examples of such alcohols include hexanol, heptanol, octanol, 2-ethylhexanol, decanol, etc. Especially preferred as an alcohol is 2-ethylhexanol. The aliphatic alcohol will be present in the silicone containing composition of the present invention in amounts of from about 20 to about 60% by weight.

The novel compositions of the present invention preferably also contain a carrier or solvent for the siloxane polymer and alcohol. Suitable solvents or carriers include kerosene, naphtha, aliphatic hydrocarbons containing from 6 to 12 carbon atoms, diesel oil, and other petroleum distillates in which the siloxane and the alcohol are soluble. Generally speaking, the carrier or solvent can comprise any organic liquid in which the siloxane polymer and the alcohol are soluble, which is generally inert in the sense that it has no deleterious effect on the delayed coking operation or reacts with the siloxane polymer and/or the alcohol. A particularly desirable solvent or carrier comprises a polyol produced by reacting dipropylene glycol with propylene oxide or ethylene oxide until a polyol is produced having the desired molecular weight, e.g. from about 1,000 to about 3,000, especially around 2,000. The polyols useful in the present invention can be represented by the following formula:

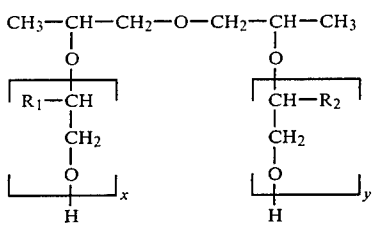

wherein $R_1$ and $R_2$ can be methyl or hydrogen and the sum of $X+Y$ is from about 30 to about 45. An especially preferred polyol is one having the above formula wherein $R_1$ and $R_2$ are methyl groups and the molecular weight is around 2,000. When a carrier or solvent is used, it will be present in the silicone containing compositions of the present invention in amounts of from about 20 to about 60% by weight.

The composition described above containing the organo siloxane polymer, the aliphatic alcohol and optionally, the carrier is especially useful in delayed coking operations when the charge feed to the coking drum contains less than about ½% by weight sulphur. In cases where the charge feed contains greater than ½% by weight sulphur, foaming in the delayed coking process can be controlled either by the silicone containing composition or simply by the addition of an effective amount of the above described aliphatic alcohol. Preferably for ease of addition, the alcohol is added as a composition comprised of from about 20 to about 60% by weight alcohol and from about 80 to about 40% by weight of one of the above-described carriers.

To more fully illustrate the method of the present invention, reference is had to the accompanying drawing. A charge feed is introduced via pump 10 and line 12 into a heater 14. The charge feed will normally comprise heavy ends from various refinery operations such as vacuum tower bottoms, gas oil recycle streams, or shale oils, coal tar pitch, etc. In heater 14, the charge feed is raised to a temperature in the range of from about 700° to 1,000° F. and is introduced via line 16 into a coking drum 18. While for simplicity, only one coking drum is shown, it will be understood, as well known to those skilled in the art, that in a typical delayed coking process at least two drums are employed, one of which is filling while the other is being decoked. Indeed, many delayed coking processes employ four or more drums. Preheating of the charge feed in heater 14 supplies the heat necessary to carry out distillation and coking in drum 18. Volatiles from the charge feed in drum 18 pass via line 20 into a fractionator 22. Coke produced in drum 18 is removed from the bottom thereof via line 24.

In fractionator 22, several streams are produced. An overhead fraction, removed via line 24 is condensed in condenser 26 and collected in an accumulator drum 28. From accumulator 28, a light gas fraction, e.g. ethane, propane, etc., is removed via line 30 while a heavier, liquid, light oil fraction is removed via line 32 and sent via pump 34 for further processing. A heavy oil, bottoms fraction is removed from fractionator 22 via line 36 and pump 38 and also sent for further processing or end use via line 40. In typical delayed coking operations, without the addition of a defoaming agent, it is possible for foam to disrupt the operation of fractionator 22 resulting in a carry over of unwanted impurities into the streams leaving via lines 24 and 36. In the method of the present invention, this foaming is controlled either by the addition of the novel defoamer composition comprised of the organo siloxane olymer and the aliphatic alcohol, or, in cases where the charge feed contains greater than ½% by weight sulphur, by the addition of the above described aliphatic alcohol, preferably with a carrier. The defoamer may be introduced directly into coking drum 18 via line 42 through valve 44 or, alternatively admixed, via line 46 and valve 48, with the heated charge feed passing through line 16 into coking drum 18. In either event, the amount of defoamer added will depend on the foaming conditions existing in coking drum 18.

As indicated, the precise amount of the defoaming agent added to the coking drum will depend upon the foaming conditions in the coking drum. However, in a typical delayed coking process it is common to add an amount of defoamer ranging from about 1 to about 24 pounds (from about 0.1 to about 3 gallons) per hundred tons of coke produced. The amount of coke produced in a typical delayed coking operation can be easily predicted from the operating conditions of the coking process and the composition of the charge feed. Accordingly, as is well known to those skilled in the art, the precise amount of defoamer to be added in any given delayed coking operation can be easily determined. The defoaming agent is conveniently added to the coking drum in admixture with a hydrocarbon diluent such as the light oil being removed via line 32 from drum 28. It has been found, for example, that the defoamer can be mixed in a 1 to 3 weight ratio with such light oil recovered from the delayed coking process and that mixture conveniently added to control foaming.

EXAMPLE 1

A defoamer comprising 50% by weight of a polyol having a molecular weight of 2,000 and 50% by weight of 2-ethylhexanol was admixed in a 1 to 3 ratio with a distilate from the delayed coking drum. The mixture was injected into the coking drum when foam was present. The total charge to the coking drum was 4,180 barrels comprised of 3,580 barrels of vacuum tar bottoms and 600 barrels of gas oil recycle. The temperature of the charge feed to the coking drum was 927° F. Approximately 40 pounds of the defoaming agent was added to the coke drum during a 20 hour cycle of the process. The defoaming agent was added to the coking drum by means of a chemical pump which pumped the defoaming mixture through a nozzle in the top of the drum. It was noted that the defoaming agent containing no silicone prevented any substantial foaming.

EXAMPLE 2

The procedure of Example 1 was followed with the exception that the defoamer used comprised 10% by weight dimethyl polysiloxane, 40% by weight 2-ethylhexanol and 60% by weight kerosene. Foaming in the coking drum was substantially prevented.

EXAMPLE 3

The procedure of Example 1 is followed with the exception that the defoamer used comprises 2-ethylhexanol added without any carrier. No substantial foaming in the coking drum is observed.

As previously noted, the method of the present invention wherein a non-silicone based defoaming agent is used has considerable advantage. For one, the cost of silicone based defoaming agents is considerably higher than that of the non-silicone based defoaming agent used in the method of the present invention. Additionally, because no silicone is present, there is no risk that the distillates recovered from the delayed coking process will be contaminated with silicone which can cause downstream catalyst poisoning. While the non-silicone based defoaming agent described herein can be used with charge feeds having greater than ½% by weight sulphur, when the sulphur content is less than ½% by weight, it is necessary to use the novel silicone-containing composition of the present invention. However, even in this case, considerable advantage is realized as compared with conventional concentrated silicone defoamers. The silicone defoamer of the present invention, although containing much less silicone, produces the same foam control properties as concentrated silicone products while minimizing the principal disadvantages involved with the use of such concentrated silicones. Specifically, since the silicone defoamers of the present invention contain only a small quantity of the organo siloxane polymer, there is less chance that silicone materials will migrate to the distillate fractions recovered from the coking drum. Accordingly, there is less chance of downstream catalyst poisoning in the subsequent processing of the streams.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

We claim:

1. In a delayed coking process wherein a heated feed stock is fed to a coking drum, the improvement comprising adding to said feed stock a foam controlling amount of an anti-foaming composition comprising a $C_6-C_{12}$ aliphatic alcohol.

2. The process of claim 1 wherein said alcohol is 2-ethylhexanol.

3. The process of claim 1 wherein said composition comprises a liquid carrier.

4. The process of claim 3 wherein said carrier comprises a polyol having the formula:

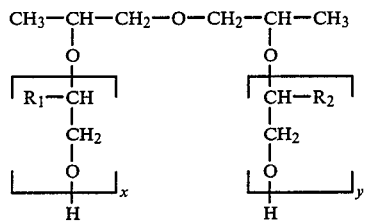

wherein $R_1$ is hydrogen or a methyl group, $R_2$ is hydrogen or a methyl group and the sum of $x+y$ is from about 30 to about 45.

5. The process of claim 4 wherein $R_1$ and $R_2$ are methyl groups.

6. The process of claim 1 wherein said alcohol is present in an amount of from about 20 to about 60% by weight.

7. In a delayed coking process wherein a heated feed stock is fed to a coking drum, the improvement comprising adding to said feed stock a foam controlling amount of an anti-foaming composition comprising a liquid organo siloxane polymer and a $C_6-C_{12}$ aliphatic alcohol.

8. The process of claim 7 wherein said composition includes a liquid carrier.

9. The process of claim 8 wherein said carrier comprises a polyol having the formula:

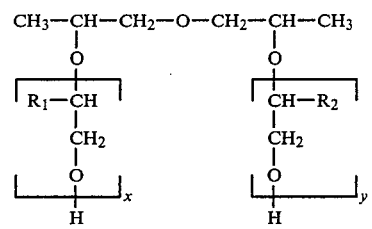

wherein $R_1$ is hydrogen or a methyl group $R_2$ is hydrogen or methyl group and the sum of $x+y$ is from about 30 to about 45.

10. The process of claim 7 wherein said organo siloxane polymer comprises dimethyl polysiloxane.

11. The process of claim 7 wherein said alcohol comprises 2-ethylhexanol.

12. The method of claim 7 wherein said organo siloxane polymer is present in an amount of from about 0.1 to about 20% by weight.

13. The method of claim 7 wherein said alcohol is present in an amount of from about 20 to about 60% by weight.

14. The method of claim 9 wherein $R_1$ and $R_2$ are methyl groups.

15. In a delayed coking process wherein a heated, sulfur contaminated feed stock is fed to a coking drum, the improvement comprising adding to said feed stock a foam controlling amount of an anti-foaming composition comprising a $C_6-C_{12}$ aliphatic alcohol and up to about 20% of a polysiloxane wherein the concentration of polysiloxane is adjusted relative to the sulfur concentration of said feed stock such that at a feed stock sulfur concentration in excess of ½ weight % the polysiloxane concentration in said anti-foaming composition is about 0.

* * * * *